United States Patent
Timon

(10) Patent No.: US 6,666,512 B1
(45) Date of Patent: Dec. 23, 2003

(54) MOTOR VEHICLE SEAT

(75) Inventor: Michel Timon, Fleury sur Orne (FR)

(73) Assignee: Faurecia Sieges d'Automobile S.A., Nanterre (FR)

( * ) Notice: Subject to any disclaimer, the term of this patent is extended or adjusted under 35 U.S.C. 154(b) by 0 days.

(21) Appl. No.: 10/210,542

(22) Filed: Aug. 1, 2002

(30) Foreign Application Priority Data

Jul. 4, 2002 (FR) ............................................. 02 08416

(51) Int. Cl.[7] ................................................. B60N 2/32
(52) U.S. Cl. ...................... 297/335; 297/336; 296/65.09
(58) Field of Search .................. 297/331, 334, 297/335, 336, 378.12; 296/65.01, 65.05, 65.09, 65.08, 65.16, 69

(56) References Cited

U.S. PATENT DOCUMENTS

| | | | |
|---|---|---|---|
| 4,273,376 A | * 6/1981 | Duguet et al. | 296/65.09 |
| 5,240,302 A | 8/1993 | Yoshida et al. | 296/65.1 |
| 5,641,202 A | * 6/1997 | Rus | 297/335 |
| 5,730,496 A | * 3/1998 | Hashimoto | 297/335 |
| 5,954,398 A | 9/1999 | Namba et al. | 297/257 |
| 6,030,038 A | * 2/2000 | Namba et al. | 297/378.12 |
| 6,113,187 A | * 9/2000 | Sugiyama et al. | 297/335 |
| 6,183,033 B1 | * 2/2001 | Arai et al. | 296/65.09 |
| 6,196,613 B1 | * 3/2001 | Arai | 296/65.13 |
| 6,231,102 B1 | 5/2001 | Wyszogrod et al. | 296/65.01 |
| 6,499,787 B2 | * 12/2002 | Jach et al. | 296/65.09 |
| 2001/0011829 A1 | 8/2001 | Wyszogrod et al. | 296/64 |
| 2002/0033624 A1 | 3/2002 | Konishi et al. | 297/336 |

FOREIGN PATENT DOCUMENTS

EP    0749413    9/1995

OTHER PUBLICATIONS

Robert, D., "Une Etonnante Metamorphose" Revue Automobile, Hallwag S.A. Berne, CH, No. 4, Jan. 24, 2002 (2 pages).

French Search Report FR 0208416, dated Apr. 10, 2003 (2 pages).

* cited by examiner

Primary Examiner—Peter R. Brown
(74) Attorney, Agent, or Firm—McCracken & Frank

(57) ABSTRACT

The motor vehicle seat comprises a seat proper and a seat back. The seat is caused to go from a passenger position to a first load position by causing the seat proper to pivot through 90° about a horizontal axis close to its front edge, and by causing the seat back to pivot through 90° about a horizontal axis close to its bottom edge. The seat back thus comes to occupy the space that is occupied by the seat proper when it is in the passenger position. The seat is caused to go from the first load position to a second load position by causing the seat proper to pivot through a further 90° about its horizontal axis. The seat is caused to go from the passenger position to the first load position, and then from the first load position to the second load position, by actuating a single handle.

7 Claims, 5 Drawing Sheets

MOTOR VEHICLE SEAT

FIELD OF THE INVENTION

The present invention relates to motor vehicle seats, and in particular to rear bench seats of the "third row" type for vehicles of the minivan or "people carrier" type.

More particularly, the invention relates to a motor vehicle seat comprising:
- a seat proper mounted to pivot about a first substantially horizontal axis between:
  - a passenger position in which it extends substantially horizontally between a front edge, close to the first axis, and a rear edge distant from the first axis;
  - an intermediate position, in which it extends substantially vertically between the front edge and the rear edge; and
  - a load position, in which it extends also substantially horizontally between the front edge and the rear edge, but with the rear edge being situated, in this position, on the side of the first axis that is opposite from the side on which it is situated in the passenger position;
- a seat back mounted to pivot about a second horizontal axis, between:
  - an upright position, in which it extends substantially vertically between a bottom edge close to the second axis, and a top edge distant from the second axis; and
  - a folded-away position, in which it extends substantially horizontally between its top edge which, in this folded-away position, is situated in the vicinity of the first axis, and its bottom edge which remains close to the second axis; and
- control means for controlling pivoting of the seat proper about the first axis, between its passenger, intermediate, and load positions.

BACKGROUND OF THE INVENTION

Seats of this type are already known in which the seat proper is caused to pivot from its passenger position to its intermediate position by simultaneously actuating the control means and the seat proper. That type of seat suffers from the drawback of requiring both hands to be used.

OBJECTS AND SUMMARY OF THE INVENTION

An object of the present invention is, in particular, to mitigate that drawback.

To this end, the invention provides a seat in which, in addition to the above-mentioned characteristics, the control means comprise:
- a lever that can be actuated manually over a first stroke between a first locking position, corresponding to the seat proper being in the passenger position, and a second locking position, corresponding to seat proper being in the intermediate position; and
- resilient return means adapted to cause the seat proper to tilt automatically from its passenger position to its intermediate position, when the lever is actuated over the first stroke.

By means of these provisions, one hand suffices to operate the lever, the seat proper being pivoted from its passenger position to its intermediate position under the drive from the return means.

In preferred embodiments of the invention, it is optionally possible to use one or more of the following additional provisions:
- the control means further comprise a cam that is secured to the lever, and a catch adapted to co-operate with the cam, when the lever is in its first locking position, and to lock the seat proper in its passenger position;
- the cam is adapted to move the catch, when the lever is actuated over its first stroke, to release the seat proper so as to enable it to pivot about the first axis, under the drive from the return means;
- the lever can be actuated manually over a second stroke between the second locking position and a third locking position, corresponding to the seat proper being in the load position;
- the return means are adapted to tilt the seat proper automatically from its intermediate position to its load position, when the lever is actuated over the second stroke; the seat proper is then pivoted between its passenger, intermediate, and load positions by means of a single control member, namely the lever, thereby avoiding the risk of error suffered by prior art seats in which pivoting from the passenger position to the intermediate position, and pivoting from the intermediate position to the load position are effected by means of two distinct control members, when the correct order in which the control members should be actuated is not complied with;
- the control means further comprise a link for preventing the seat proper from pivoting about the first axis, from its intermediate position to its load position;
- the lever is adapted to move the link when the lever is actuated over its second stroke to release the seat proper to enable it to pivot about the first axis, under the drive from the return means, from its intermediate position to its load position; and
- the control means and the resilient return means are situated on respective sides of the seat proper, i.e. at opposite ends as considered in a transverse direction parallel to the first axis.

BRIEF DESCRIPTION OF THE DRAWINGS

Other features, objects, and advantages of the invention will appear on reading the following description of an embodiment of it.

The invention will also be better understood on examining the drawings, in which.

MORE DETAILED DESCRIPTION

In the various figures, like references are used to designate identical or similar elements.

An embodiment example of the invention is described below by way of non-limiting illustration.

Figure 1:
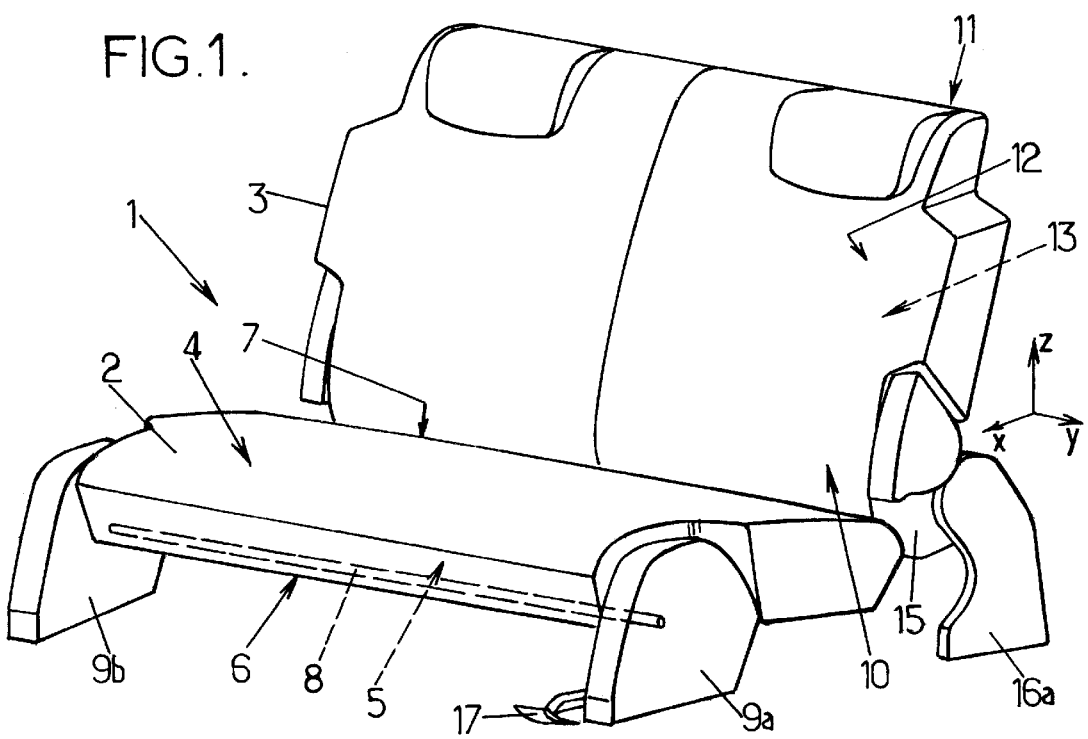
FIG. 1 is a diagrammatic perspective view of an example of a seat of the invention, in the passenger position.

In this embodiment example, the seat of the invention is a rear bench seat of the "third row" type, for a vehicle of the minivan or "people carrier" type. As shown in FIG. 1, this seat 1 comprises a seat proper 2 and a seat back 3. In the configuration shown in FIG. 1, a user sitting on the seat 1 is facing forwards in the forward direction X of the vehicle in which the seat 1 is situated.

In FIG. 1, the seat is shown in a passenger position. In this position, the seat proper 2 extends substantially in a horizontal plane XY. The seat proper 2 has a top face 4, on which the users of the seat 1 can sit. The seat proper 2 also has a bottom face 5 opposite from the top face 4, and provided with a panel suitable for receiving loads, when the seat proper is in the load position (see FIG. 4). The seat proper 2 extends between a front edge 6 and a rear edge 7. The front edge is in the vicinity of a first axis 8 which is the longitudinal axis of a first rod and about which the seat proper 2 can pivot.

The rod having the first axis 8 extends longitudinally and substantially parallel to a horizontal direction Y. It rests at each of its longitudinal ends on legs 9a, 9b of the seat proper.

When the seat 1 is in the passenger position, the seat back 3 extends substantially vertically in a plane YZ, in the upright position, between a bottom edge 10 and a top edge 11. The seat back 3 has a front face 12, against which the user can lean when the seat 1 is in the passenger position, and a rear face 13 provided with a plate suitable for receiving loads, when the seat back 3 is in the folded-away position (see FIGS. 3 and 4).

The seat back 3 pivots about a second axis 14 (see FIG. 2) which is the longitudinal axis of a second rod and which is substantially parallel to the horizontal direction Y. The rod having the second axis 14 rests via seat back cheek plates 15 on legs 16a, 16b of the seat back.

The seat proper 2 is caused to pivot about the first axis 8 by actuating a lever 17 supported by the leg 9a of the seat proper.

Figure 2:
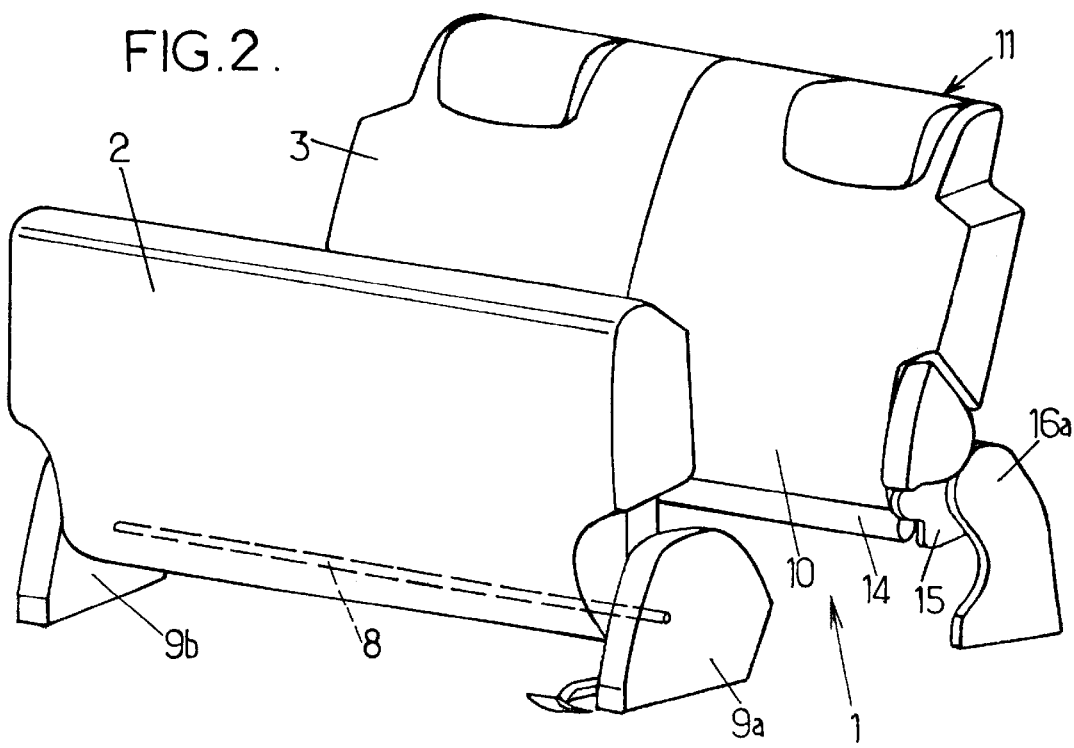
FIG. 2 is a diagrammatic perspective view of the seat of FIG. 1, in which the seat proper is in the intermediate position.

As shown in FIG. 2, in the intermediate position, the seat proper 2 extends substantially vertically between the front edge 6 and the rear edge 7. The seat proper 2 pivots through 90° from the passenger position (FIG. 1) to the intermediate position (FIG. 2) about the first axis 8.

Figure 3:
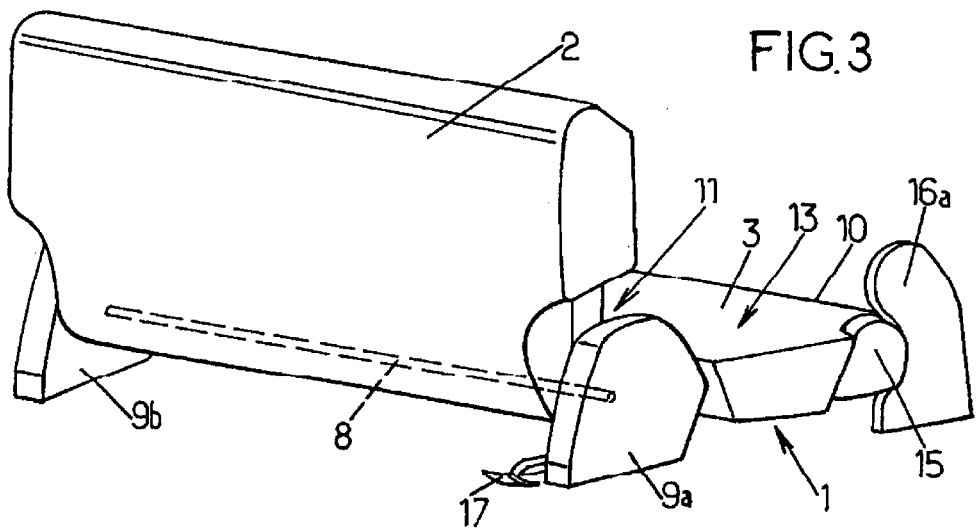
FIG. 3 is a diagrammatic perspective view of the seat shown in FIGS. 1 and 2, with the seat proper in the intermediate position, and the seat back in the folded-away position, this configuration generally being referred to as the "cargo" configuration.

By going from the passenger position to the intermediate position, the seat proper 2 vacates a space situated between the legs 9a, 9b of the seat proper and the legs 16a, 16b of the seat back and that the seat back 3 can come to occupy by pivoting through 90° about the second axis 14, from its upright position (FIG. 1) to its folded-away position (FIG. 3). In the folded-away position, the top edge 11 of the seat back 3 lies in the vicinity of the first axis 8, while its bottom edge remains hinged to the rod having the second axis 14.

This configuration of the seat 1, with the seat proper 2 in the intermediate position and the seat back 3 in the folded-away position, is generally referred to as the "cargo" configuration. In the cargo configuration, can be inserted via the rear of the vehicle in which the seat 1 is situated, so as to deposit them on the rear face 13 of the seat back 3.

Figure 4:
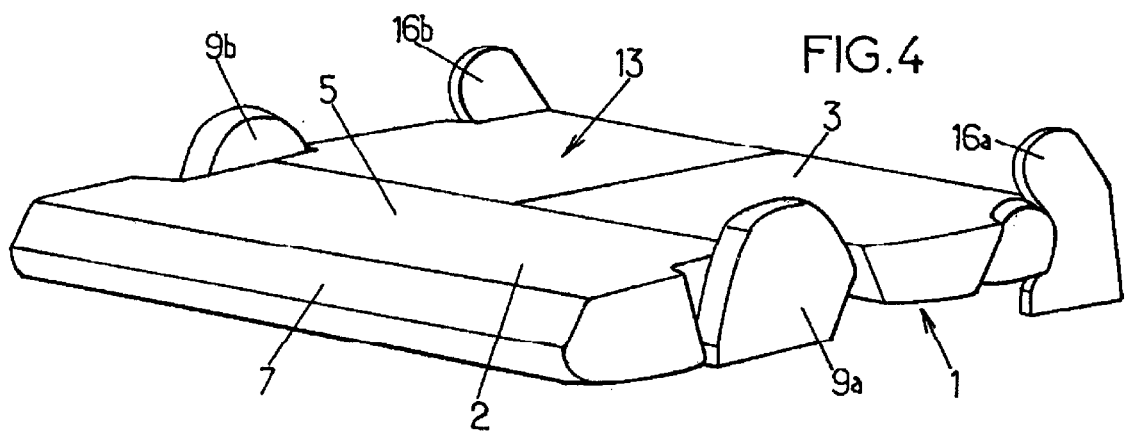
FIG. 4 is a diagrammatic perspective view of the seat shown in FIGS. 1, 2, and 3, with the seat proper in the load position and the seat back is in the folded-away position, this seat configuration generally being referred to as the "full cargo" configuration.

To gain even more loading volume, the seat proper 2 may be lowered from the intermediate position (FIGS. 2 and 3) to the load position shown in FIG. 4. In this configuration, referred to as the "full cargo" configuration, the seat proper 2 has been pivoted relative to the passenger position through 180° about the first axis 8. The rear edge 7 is then on the side of the first axis 8 that is opposite from the side on which it is situated when it occupies the passenger position (FIG. 1). When the seat 1 is in this configuration, loads can be deposited both on the bottom face 5 and on the rear face 13.

Figure 5:
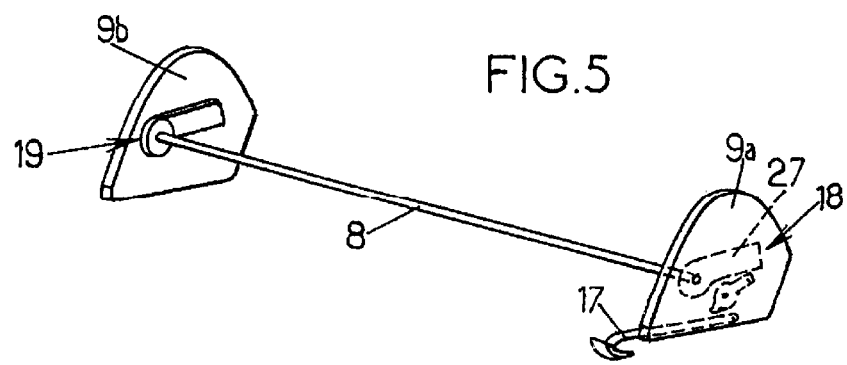
FIG. 5 is a diagrammatic perspective view of the elements of the mechanism for pivoting the seat proper.

As shown in FIG. 5, the rod having the first axis 8 turns about its longitudinal axis (i.e. said first axis) firstly by means of control means 18, and secondly by means of resilient return means 19. For example, the return means 19 may be constituted by a spiral spring suitable for exerting drive that urges the rod having the first axis 8 to turn about its longitudinal axis (i.e. said first axis), clockwise in FIG. 5. The control means 18, and the return means 19 are situated on either side of the seat proper 2, as considered in its dimension parallel to the direction Y.

The control means 18 are described in detail below with reference to FIGS. 6, 7, and 8.

The control means 18 comprise a lever 20 that can be actuated manually via the handle 17, a cam 21, secured to the lever 20, a catch 22 suitable for co-operating with the cam 21, a link 23, first and second springs 24, 25, and a wheel 26.

The seat proper 2 rests on the seat proper legs 9a, 9b via cheek plates 27 constrained to rotate with the rod having the first axis 8.

In the passenger position, the wheel 26 is locked so that it is prevented from rotating about the first axis 8 by the interaction of peripheral teeth 28 interacting with complementary teeth on the catch 22.

The first spring 24 returns the lever 20 counterclockwise. The second spring 25 tends to keep the link 23 in contact with the wheel 26.

Figure 6:
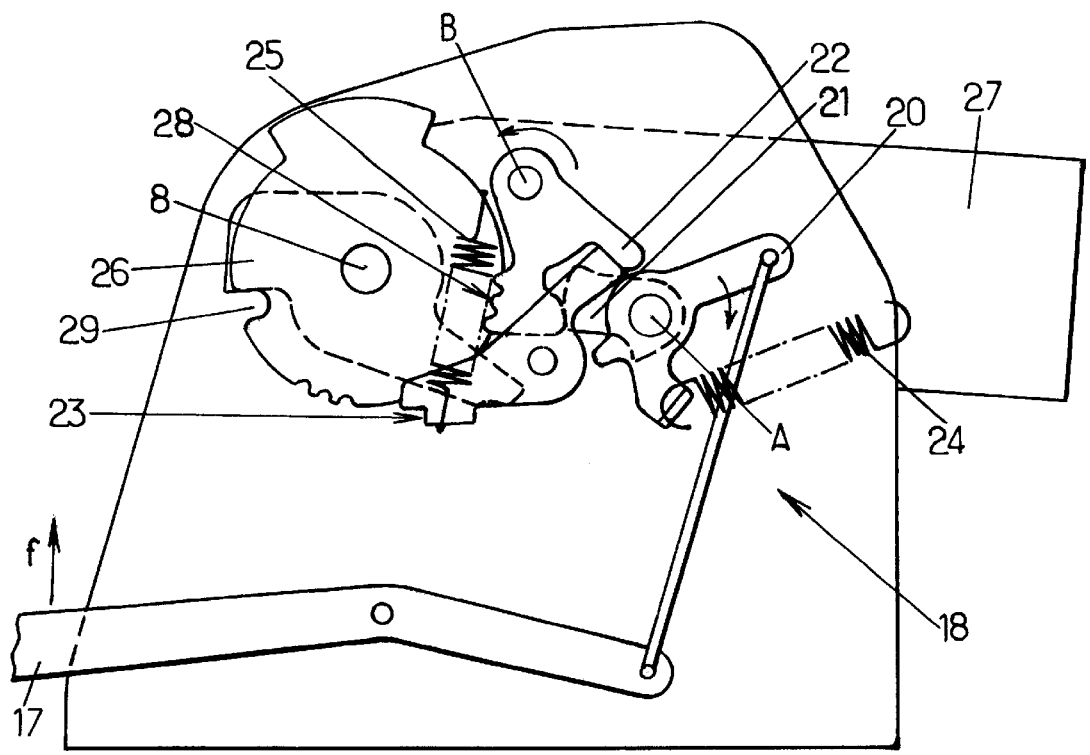
FIG. 6 is a diagrammatic side view of the control means for controlling pivoting of the seat proper, in their configuration corresponding to the seat proper being in the passenger position.

In FIG. 6, the control means 18 are in a first locking position. When the handle 17 is raised (by exerting a force against the first spring 24) in the direction indicated by the arrow F, the lever turns through a first stroke (e.g. 16 mm) clockwise about an axis A substantially parallel to the horizontal axis Y. By turning in this way, it drives the cam 21. The cam 21 then co-operates with the catch 22 and turns it counterclockwise about an axis B that is also substantially parallel to the axis Y.

As the catch turns in this way, the teeth on the catch 22 are disengaged from the teeth 28 on the wheel 26. There is then no longer anything to prevent the rod having the first axis 8 from rotating under the drive from the return means 19. However, if the lever 20 is actuated over the first stroke only, which stroke is adapted to drive the catch 22 only, the link 23, which is returned resiliently onto the wheel 26 by the second spring 25, engages in a notch 29 in the wheel 26, thereby locking it to prevent it from rotating, against the force exerted by the return means 19.

Figure 7:
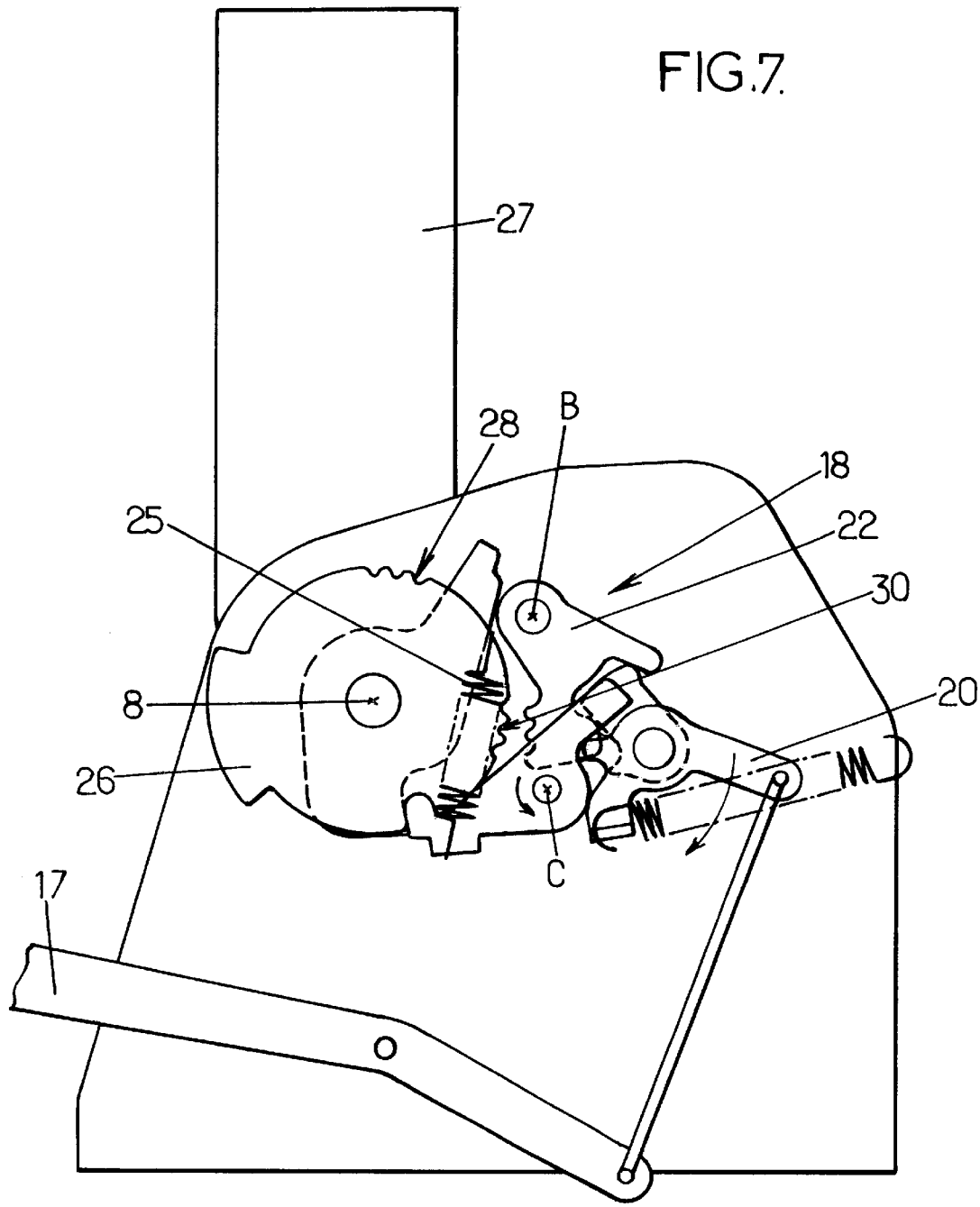
FIG. 7 is a view analogous to the view of FIG. 6, showing the control means for controlling pivoting of the seat proper, the seat proper being in the intermediate position.
Figure 8:
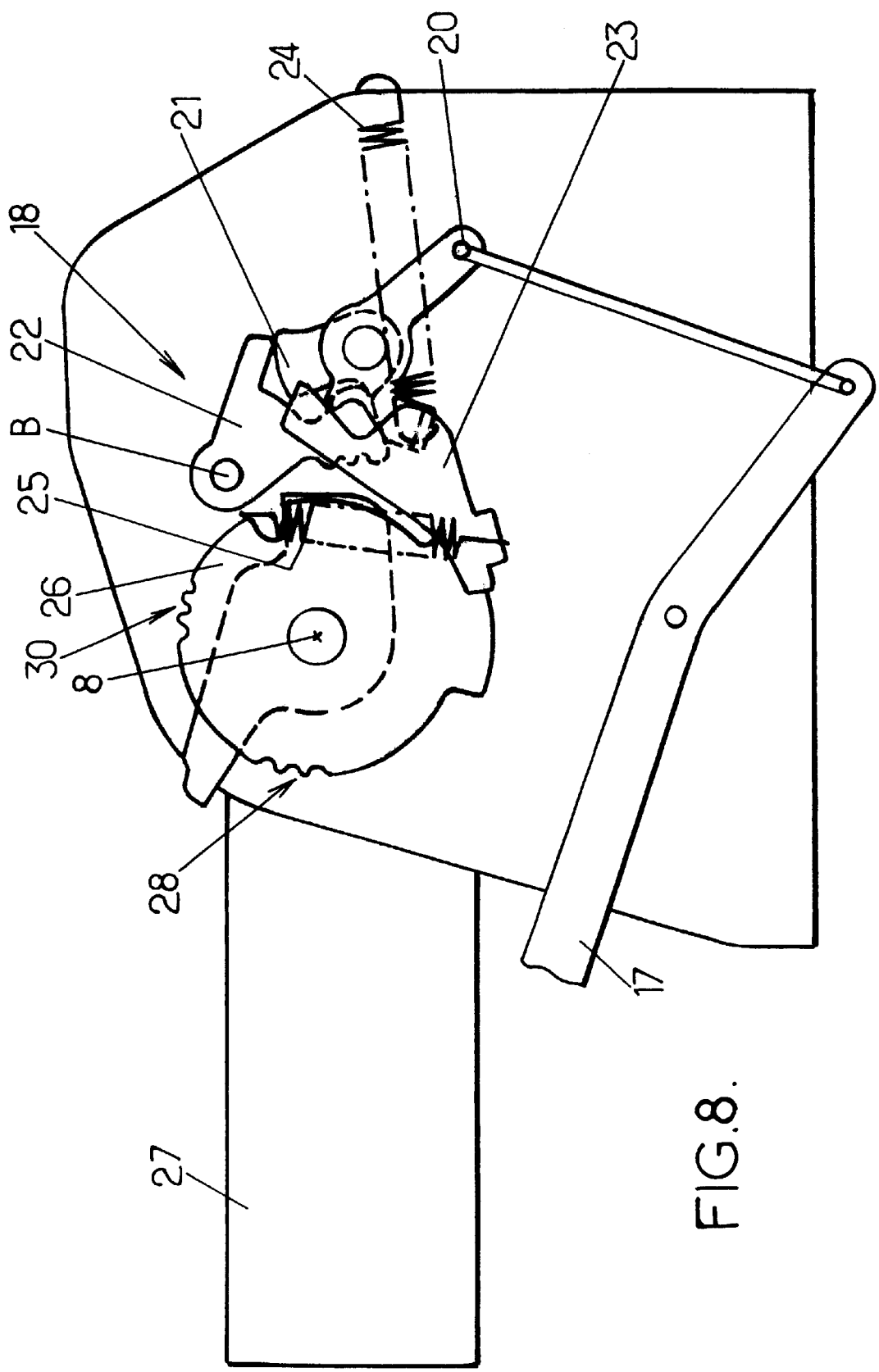
FIG. 8 is a view analogous to the views of FIGS. 6 and 7, showing the control mechanism for controlling pivoting of the seat proper, the seat proper being in the load position.

The control means 18 are then in a second locking position corresponding to the configuration shown in FIG. 7, itself corresponding to the intermediate position of the seat proper 2.

If the handle 17 is released, the first spring 24 returns the lever 20 counterclockwise. The cam 21 pushes the catch 22 against the wheel 26. The teeth of the catch 22 then engage the teeth 30 of the wheel 26, which are offset angularly by about 90° about the axis B relative to the teeth 28.

The seat proper 2 is thus prevented from rotating about the first axis 8 in the intermediate position.

To return the seat proper 2 from its intermediate position to its passenger position, it is necessary merely to actuate the handle 17, as indicated above, and to exert a force manually on the seat proper 2, clockwise, about the first axis 8, until it is repositioned in the passenger position (FIG. 1).

Starting from the configuration shown in FIG. 7, if the handle 17 is actuated again in the direction F, by exerting an additional force (against the first spring 24 but also against the second spring 25), the lever 20 turns again clockwise over a second stroke. As it turns over the second stroke, it turns the link 23 counterclockwise. The link 23 is then released from the notch 29. Neither the link 23, nor the catch 22, which remains driven by the cam 21, then act any more to oppose turning of the wheel 26 counterclockwise, about the first axis 8, under the drive from the return means 19.

The handle 17 can be released, and the control means 18 are in the third locking position. The seat proper 2 is held in the load position, in abutment against the floor of the motor vehicle.

The seat proper 2 can be brought from its load position to its intermediate position without operating the handle 17 or the control means 18, merely by raising the seat proper against the force exerted by the return means 19.

The seat back 3 is pivoted from its upright position (FIG. 2) to its folded-away position (FIGS. 3 and 4) in a manner known to the person skilled in the art.

What is claimed is:

1. A motor vehicle seat comprising:
   a seat proper mounted to pivot about a first substantially horizontal axis between:
      a passenger position in which it extends substantially horizontally between a front edge, close to the first axis, and a rear edge distant from the first axis;
      an intermediate position, in which it extends substantially vertically between the front edge and the rear edge; and
      a load position, in which it extends also substantially horizontally between the front edge and the rear edge, but with the rear edge being situated, in this position, on the side of the first axis that is opposite from the side on which it is situated in the passenger position;
   a seat back mounted to pivot about a second horizontal axis, between:
      an upright position, in which it extends substantially vertically between a bottom edge close to the second axis, and a top edge distant from the second axis; and
      a folded-away position, in which it extends substantially horizontally between its top edge which, in this folded-away position, is situated in the vicinity of the first axis, and its bottom edge which remains close to the second axis; and
   control means for controlling pivoting of the seat proper about the first axis, between its passenger, intermediate, and load positions;
   wherein the control means comprise:
      a lever that can be actuated manually over a first stroke between a first locking position, corresponding to the seat proper being in the passenger position, and a second locking position, corresponding to seat proper being in the intermediate position; and
      resilient return means urging a rod with which the seat proper can pivot and extending along said first axis, in order to turn said rod about said first axis, said resilient return means causing said seat proper to tilt automatically from its passenger position to its intermediate position, when the lever is actuated over the first stroke.

2. A seat according to claim 1, in which the control means further comprise a cam that is secured to the lever, and a catch adapted to co-operate with the cam, when the lever is in its first locking position, and to lock the seat proper in its passenger position.

3. A seat according to claim 2, in which the cam is adapted to move the catch, when the lever is actuated over its first stroke, to release the seat proper so as to enable it to pivot about the first axis, under the drive from the return means.

4. A seat according to claim 1, in which:
   the lever can be actuated manually over a second stroke between the second locking position and a third locking position, corresponding to the seat proper being in the load position; and
   the return means are adapted to tilt the seat proper automatically from its intermediate position to its load position, when the lever is actuated over the second stroke.

5. A seat according to claim 4, in which the control means further comprise a link for preventing the seat proper from pivoting about the first axis, from its intermediate position to its load position.

6. A seat according to claim 5, in which the lever is adapted to move the link when the lever is actuated over its second stroke to release the seat proper to enable it to pivot about the first axis, under the drive from the return means, from its intermediate position to its load position.

7. A seat according to claim 1, in which the control means and the resilient return means are situated on respective sides of the seat proper, i.e. at opposite ends as considered in a transverse direction parallel to the first axis.

* * * * *